May 9, 1933.  O. L. SNYDER  1,908,071
CRANK SHAFT
Filed Aug. 8, 1929
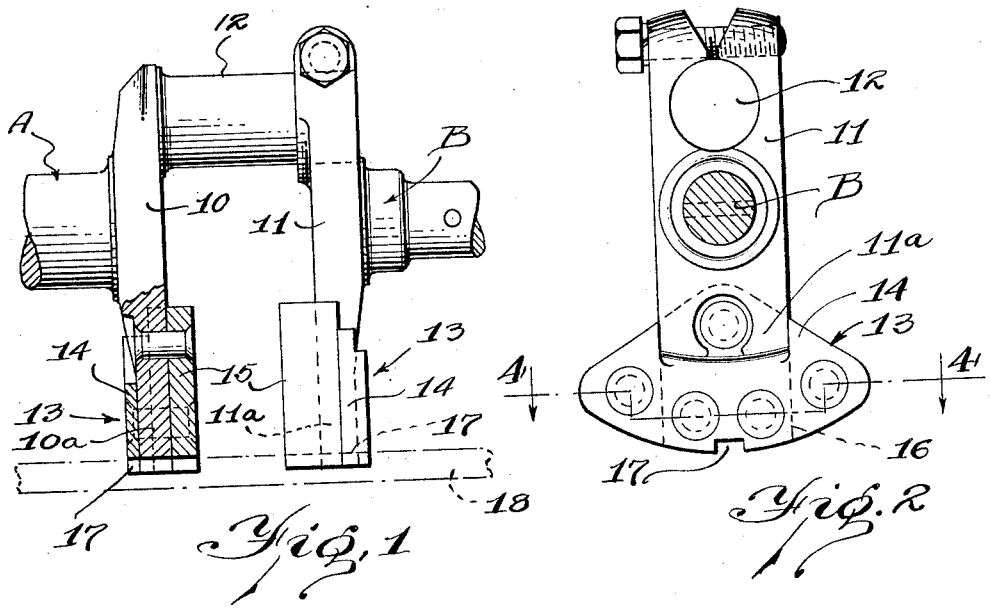
Fig. 1
Fig. 2
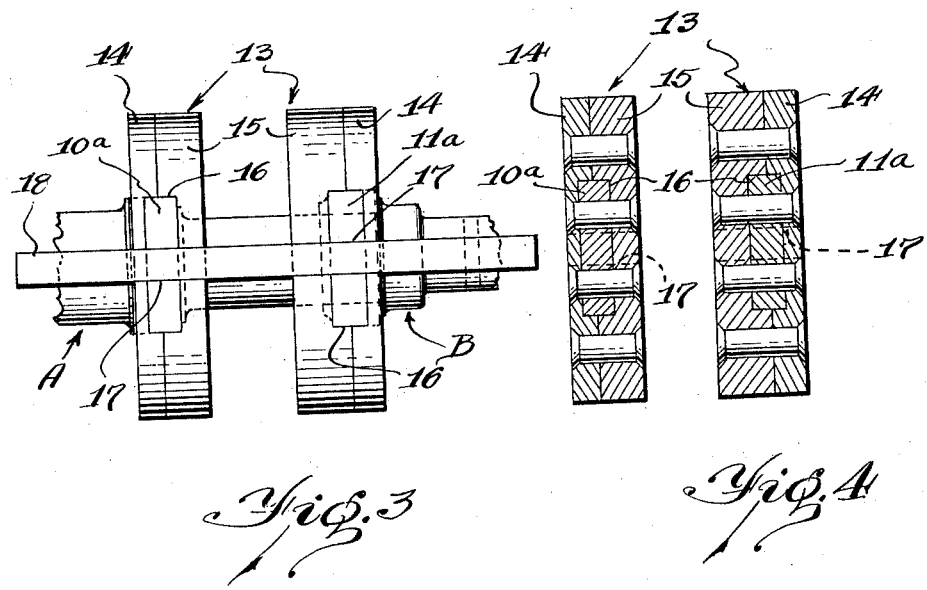
Fig. 3
Fig. 4
INVENTOR.
Oscar L. Snyder
BY W. W. Harris
ATTORNEY.

Patented May 9, 1933

1,908,071

UNITED STATES PATENT OFFICE

OSCAR L. SNYDER, OF MARYSVILLE, MICHIGAN, ASSIGNOR, BY MESNE ASSIGNMENTS, TO CONTINENTAL AIRCRAFT ENGINE COMPANY, A CORPORATION OF DELAWARE

CRANK SHAFT

Application filed August 8, 1929. Serial No. 384,432.

This invention relates to internal combustion engines, and is more particularly related to the crank shaft construction and assembly with special reference to the re-assembly of the front crank shaft in accurate alignment with the crank shaft bearings. The invention relates particularly to engines of the radial cylinder aircraft type in which a plurality of connecting rods articulate on a crank throw.

In order to facilitate the manufacture of crank shafts, the counter weights are preferably designed as separate elements and then assembled to the crank shaft after the said crank shaft has been machined. The crank shaft elements and the attached counterweights must be very accurately aligned when assembled. Difficulty has been experienced heretofore in realigning these several elements, following the servicing of the same and frequently the said elements are inaccurately aligned with the subsequent reduction in engine efficiency.

It is the object of the present invention to reduce the servicing costs for engines of this character and to insure the accurate realignment of the crank shaft elements, by providing means for readily and accurately realigning the same.

A further object of the invention is to facilitate the accurate realigning of the crank shaft elements and the attached counterweights by providing means for positioning the said elements and which is applied at a remote point with respect to the longitudinal axis of the crank shaft to minimize the error and thus insure a more accurate realignment of the said crank shaft elements.

For a more detailed understanding of the invention reference may be had to the accompanying drawing, which illustrates one form which the invention may assume, and in which:

Fig. 1 is a side elevation of a portion of a crank shaft constructed in accordance with the invention, Fig. 2 is an end view thereof, Fig. 3 is a bottom plan view showing the aligning bar engaged therewith, and Fig. 4 is a sectional view taken on the line 4—4 of Fig. 2.

The drawing illustrates a fragmentary portion of a crank shaft, which is preferably constructed of a multiple number of elements that must be very accurately aligned and secured together. The crank shaft assembly comprises the front crank shaft bearing portion A and the rear crank shaft bearing portion B, a cheek 10 being integrally carried by the crank shaft portion A and a cheek 11 being similarly carried by the crank shaft portion B. A crank pin 12, offset from the longitudinal axis of the crank shaft, is carried by the cheek 10, the cheek 11 being adjustably clamped to the pin 12 in the usual manner. The pin 12 receives the usual connecting rod or articulated rods (not shown) in the case of a radial engine.

A counterweight assembly 13 is secured to each of the cheeks 10 and 11, and preferably consists of a pair of counterweights 14 and 15, which are riveted or otherwise permanently secured together and to the cheek portions of the crank shaft. Preferably, the counterweights are slotted, as at 16, the cheek arms 10—a and 11—a being fitted into the slotted portions of said counterweights. This construction permits the separate machining of the front and rear crank shaft bearing portions, and the counterweights attached thereto, prior to the crank shaft assembly. Thus the crank shaft and counterweights can be more readily and economically manufactured.

When the crank shaft elements, with the attached counterweights, are assembled together in the factory, they are very accurately aligned together i. e., the front and rear crank shaft bearing portions are so aligned as to line up the longitudinal axes thereof.

When the crank shaft assembly is torn down for servicing or replacement of worn out parts, it is quite essential that the front and rear crank shaft bearing portions be very accurately positioned again in exact alignment. This is accomplished by a very simple arrangement. When the said front and rear crank shaft bearing portions with the attached counterweights have been accurately aligned and secured together at the factory, a milling machine cutter is preferably moved across the extreme outer rims of the counterweights to cut the transverse slots or grooves 17 therein. The front and rear crank shaft bearing portions can be readily positioned again in accurate alignment by inserting a bar 18 in the slots 17 carried by the counterweights.

It will be noted, that these slots 17 are located at the maximum possible distance from the longitudinal axes of the crank shaft elements, thus minimizing any error that may occur. In fact, with the design as described above, the error is negligible and the crank shaft elements may be very accurately positioned in practically the identical alignment, as when first assembled at the factory.

Although but one form of the invention has been illustrated and but a single application thereof has been described in detail, it will be apparent to those skilled in the art to which this invention pertains, that various modifications and changes may be made therein without departing from the spirit of the invention or from the scope of the appended claims.

What I claim as my invention is:

1. A built-up crank shaft for an internal combustion engine including a pair of crank shaft portions, one of said portions having a crank cheek and a crank pin whose axis is offset in parallel relation with respect to the crank shaft axis, the other crank shaft portion having a crank cheek spaced from the cheek carried by said other crank shaft portion and adjustably secured to said spaced crank pin, said crank shaft portions each provided with means respectively spaced longitudinally of the crank shaft, said means adapted to be aligned for effecting a predetermined alignment of said crank shaft portions.

2. A built-up crank shaft for an internal combustion engine including a pair of crank shaft portions, one of said portions having a crank cheek and a crank pin whose axis is offset in parallel relation with respect to the crank shaft axis, the other crank shaft portion having a crank cheek adjustably secured to said crank pin, said crank cheeks spaced axially of the crank shaft, said crank shaft portions each provided with means respectively spaced axially of the crank shaft and located on the other side of the crank shaft axis from the crank pin, said means adapted to be aligned for effecting a predetermined alignment of said crank shaft portions.

3. A built-up crank shaft for an internal combustion engine including a pair of crank shaft portions, one of said portions having a crank pin whose axis is offset in parallel relation with respect to the crank shaft axis, the other crank shaft portion adjustably secured to said crank pin, said crank shaft portions spaced axially of the crank shaft and each provided with a recess adapted to receive an aligning bar for effecting a predetermined alignment of said crank shaft portions.

4. A built-up crank shaft for an internal combustion engine including a pair of crank shaft portions, one of said portions having a crank pin whose axis is offset in parallel relation with respect to the crank shaft axis, the other crank shaft portion adjustably secured to said crank pin, said crank shaft portions having counterweights extending substantially transversely of the crank shaft axis to that side thereof remote from the crank pin and spaced axially of the crank shaft, said counterweights each provided with a groove adapted to be respectively aligned for effecting a predetermined alignment of said crank shaft portions.

5. A built-up crank shaft for an internal combustion engine including a pair of crank shaft portions, one of said portions having a crank pin whose axis is offset in parallel relation with respect to the crank shaft axis, the other crank shaft portion secured to said crank pin, said crank shaft portions having counterweights extending substantially transversely of the crank shaft axis to that side thereof remote from the crank pin and spaced axially of the crank shaft, said counterweights each provided with means adapted for cooperative registration with respect to an aligning member for effecting a predetermined alignment of said crank shaft portions.

6. A built-up crank shaft for an internal combustion engine including a pair of crank shaft portions, one of said portions having a crank pin whose axis is offset in parallel relation with respect to the crank shaft axis, the other crank shaft portion secured to said crank pin, said crank shaft portions having counterweights extending substantially transversely of the crank shaft axis to that side thereof remote from the crank pin and spaced axially of the crank shaft, said counterweights each provided with a recess adapted for cooperative reception of an aligning bar for effecting a predetermined alignment of said crank shaft portions.

7. A built-up crank shaft for an internal combustion engine including a pair of crank shaft portions, one of said portions having a crank pin whose axis is offset in parallel relation with respect to the crank shaft axis, the other crank shaft portion adjustably secured to said crank pin, said crank shaft portions having counterweights extending substantially transversely of the crank shaft axis to that side thereof remote from the crank pin and spaced axially of the crank shaft, said counterweights each provided with a groove extending transversely across the outer peripheral face thereof in a direction substantially parallel to the crank shaft axis, said grooves being adapted for cooperative reception of an aligning bar for effecting a predetermined alignment of said crank shaft portions.

In testimony whereof I affix my signature.

OSCAR L. SNYDER.